United States Patent
Fisher (10) Patent No.: US 8,205,536 B2
(45) Date of Patent: Jun. 26, 2012

(54) INTEGRATED WEAPONS POD

(75) Inventor: Jeremy Francis Fisher, Southlake, TX (US)

(73) Assignee: EFW Inc., Fort Worth, TX (US)

( * ) Notice: Subject to any disclaimer, the term of this patent is extended or adjusted under 35 U.S.C. 154(b) by 727 days.

(21) Appl. No.: 12/136,888

(22) Filed: Jun. 11, 2008

(65) Prior Publication Data

US 2009/0100995 A1 Apr. 23, 2009

Related U.S. Application Data

(60) Provisional application No. 60/943,743, filed on Jun. 13, 2007.

(51) Int. Cl.
*B64D 1/04* (2006.01)
(52) U.S. Cl. .................. 89/1.11; 89/37.01; 89/37.16
(58) Field of Classification Search ........ 89/37.01–37.02, 89/37.16–37.17, 37.19, 40.03, 41.01–41.02, 89/41.05, 41.06, 1.11
See application file for complete search history.

(56) References Cited

U.S. PATENT DOCUMENTS

| | | | |
|---|---|---|---|
| 6,269,730 B1 * | 8/2001 | Hawkes et al. | 89/41.05 |
| 6,769,347 B1 * | 8/2004 | Quinn | 89/41.05 |
| 7,086,318 B1 * | 8/2006 | Darnall | 89/1.815 |
| 7,211,980 B1 | 5/2007 | Bruemmer et al. | 318/587 |
| 7,669,513 B2 * | 3/2010 | Niv et al. | 89/40.03 |
| 2004/0050240 A1 * | 3/2004 | Greene et al. | 89/41.06 |
| 2005/0066806 A1 * | 3/2005 | Helms et al. | 89/38 |
| 2005/0204910 A1 * | 9/2005 | Padan | 89/1.813 |
| 2006/0219094 A1 | 10/2006 | Padan | 89/37.16 |
| 2007/0119296 A1 | 5/2007 | Niv et al. | 89/37.02 |
| 2007/0261544 A1 * | 11/2007 | Philippe | 89/41.05 |
| 2008/0034954 A1 * | 2/2008 | Grober | 89/41.05 |

OTHER PUBLICATIONS

PCT Notification of Transmittal of the International Search Report and the Written Opinion of the International Searching Authority, or the Declaration; International Application No. PCT/US08/66812; International Filing Date: Jun. 13, 2008, Mar. 10, 2009.

* cited by examiner

*Primary Examiner* — Gabriel Klein
(74) *Attorney, Agent, or Firm* — Baker Botts L.L.P.

(57) ABSTRACT

An integrated weapons pod includes a plurality of pod components such as a targeting system, a weapons bay, a central processing unit ("CPU"), a wireless data link, and an external shell. The external shell houses the targeting system, the weapons bay, the CPU, and the wireless data link in a single freestanding unit. The weapons bay is configured to house one or more weapons and deploy the one or more weapons at a target. The CPU is operable to control operation of the targeting system, the weapons bay, and the wireless data link. The targeting system is operable to provide to the one or more weapons location information identifying a location of the target, and the wireless data link is operable to exchange data with a remote operator.

23 Claims, 2 Drawing Sheets

INTEGRATED WEAPONS POD

CROSS REFERENCE TO RELATED APPLICATIONS

This application claims the benefit under 35 U.S.C. §119 (e) of U.S. Provisional Application No. 60/943,743, entitled "An Integrated Weapons Pod," filed Jun. 13, 2007.

TECHNICAL FIELD

The present disclosure relates generally to weapons and more particularly to an integrated weapons pod.

BACKGROUND

In the field of combat, a strike-ready vehicle (e.g., a vehicle equipped with weapons as well as effective means for weapons deployment) may not always be readily available for use on a particular mission. Consequently, the mission may have to be delayed until the strike-ready vehicle can be acquired or the mission may have to be modified to proceed without the strike-ready vehicle, possibly making the mission more dangerous. Consequently, it would be beneficial to have strike-ready vehicles readily available for a mission when the mission is planned.

SUMMARY

The present disclosure relates generally to an integrated weapons pod capable of adding self-contained offensive weapons capability to a vehicle and method of use therefore. In particular embodiments, the integrated weapons pod includes a plurality of pod components such as a targeting system, a weapons bay, a central processing unit ("CPU"), a wireless data link, and an external shell. The external shell houses the targeting system, the weapons bay, the CPU, and the wireless data link in a single freestanding unit. The weapons bay is configured to house one or more weapons and deploy the one or more weapons at a target. The CPU is operable to control operation of the targeting system, the weapons bay, and the wireless data link. The targeting system is operable to provide to the one or more weapons location information identifying a location of the target, and the wireless data link is operable to exchange data with a remote operator.

In particular embodiments, the external shell further includes a pod interface configured to attach to a preconfigured attachment point on the vehicle. Moreover, the pod interface may include a power input operable to transmit electrical power from the vehicle to one or more of the plurality of the pod components.

In particular embodiments, the data exchanged between the wireless data link and the remote operator may be component control information. Accordingly, the wireless data link may enable the remote operator to control one or more of the plurality of pod components by transmitting the component control information from the remote operator to the CPU.

In particular embodiments, the pod interface may further include a vehicle control interface that may transmit vehicle control information from the CPU to the vehicle. Accordingly, the data exchanged between the wireless data link and the remote operator may be vehicle control information and the wireless data link may enable the remote operator to control the movement of the vehicle by transmitting the vehicle control information from the remote operator to the CPU.

In particular embodiments, the targeting system may include a laser designator, a laser spot tracker, a thermal imager, and a video camera. The data exchanged between the wireless data link and the remote operator may be viewing information from the targeting system such that the wireless data link may enable the remote operator to view the target by transmitting the viewing information from the targeting system to the remote operator.

In particular embodiments, the laser designator may be operable to designate the target with a laser beam and the laser spot tracker may be operable to receive a portion of the laser beam reflected off the target and generate an indication that enables the remote operator to visually confirm that the laser designator is designating the target. Moreover, the viewing information transmitted from the targeting system to the remote operator may include the indication from the laser spot tracker.

In particular embodiments, the weapons pod may further include a Global Positioning System ("GPS") receiver operable to provide the CPU with an approximately real-time location of itself.

In particular embodiments, the weapons pod may further include a vehicle-independent power source which powers one or more of the plurality of pod components.

In particular embodiments, the CPU may further include a removable storage device operable to store data from CPU 112.

By including a targeting system, a weapons bay having one or more weapons, a central processing unit ("CPU"), and a wireless data link in a single freestanding unit that may be attached to a vehicle to add offensive weapons capability to the vehicle, an integrated weapons pod may provide technical advantages such as the ability to covertly introduce a weapons-ready vehicle into a battle zone by transporting the weapons pod into the battle zone rather than having to transport the entire weapons-ready vehicle into the battle zone. Moreover, by including all the systems necessary for autonomous operation in the integrated weapons pod, the integrated weapons pod may provide further technical advantages such as the ability to add offensive weapons capability to any vehicle, whether civilian or military, manned or unmanned, simply by attaching the integrated weapons pod to the vehicle.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

In particular embodiments, a military or civilian vehicle 150 (e.g., a boat, a car, an aircraft, etc.), both manned or unmanned, may be retrofitted with one or more pods (e.g., self-contained modular equipment packages) to add one or more capabilities to vehicle 150 that were not originally built into vehicle 150. As an example and not by way of limitation, vehicle 150 may be retrofitted with a thermal imaging pod to enable vehicle 150 to capture thermal images, an electronic jamming pod to enable vehicle 150 to jam radio communications, a targeting pod to enable vehicle 150 to acquire or provide location information regarding a target, a photographic pod to enable vehicle 150 to capture visual images, or a sensing optics pod to enable vehicle 150 to acquire optical sensory information.

Figure 1:
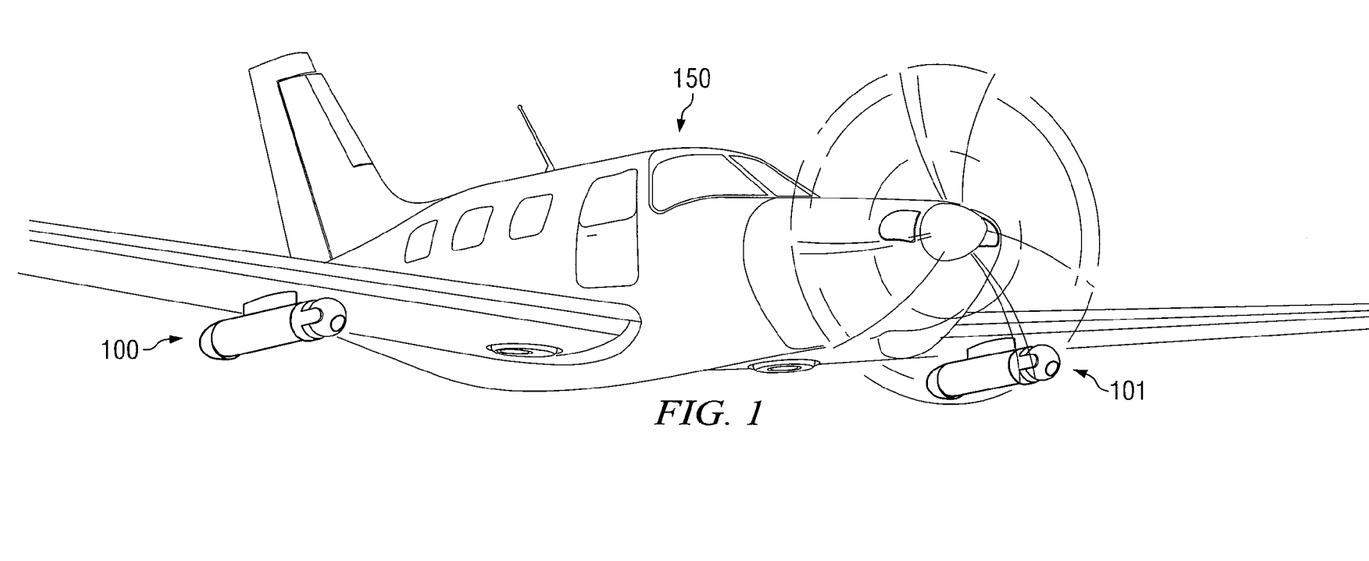
FIG. 1 illustrates an aircraft carrying two example integrated weapons pods according to an example embodiment of the present disclosure.

FIG. 1 illustrates an aircraft vehicle 150 carrying two example integrated weapons pods, weapons pod 100 and weapons pod 101. In particular embodiments, weapons pod 100 and weapons pod 101 may include the same level or functionality or one of the weapons pods (e.g., pod 101) may be a less functional "dumb" pod 101 having one or more components controlled (e.g., wirelessly) by weapons pod 100. As an example and not by way of limitation, dumb pod 101 may be added to vehicle 150 to increase the weapons capacity of vehicle 150 (e.g., to add more or different weapons to vehicle 150), or to balance vehicle 150. Depending upon the design of dumb pod 101, pod 101 may include the same, less, or different components as weapons pod 100. While the illustrated embodiments, contains two pods, the present disclosure contemplate any number of pods being included on vehicle 150.

Though particular embodiments of the present disclosure may be described with respect to vehicle 150 as an aircraft, vehicle 150 could just as easily be a ground vehicle, a water borne vehicle, or any other type of vehicle suitable for transporting weapons pod 100. In particular embodiments, vehicle 150 may provide a mode of transportation for weapons pod 100 and possibly a source of power but little, if anything, else.

In particular embodiments, the components of weapons pod 100 may work together to provide autonomous weapons capability for vehicle 150. By autonomous weapons capability, it is meant that weapons pod 100 may be provided with all systems necessary for weapons pod 100 to operate (e.g., to effectively deploy weapons 108 at a target) without any reliance on vehicle 150 other than as a mode of transportation. Thus, weapons pod 100 may contain an entire weapon system, complete from "sensor to shooter," in one self-contained unit. However, depending on the embodiment, some information may be provided from external sources, perhaps providing duplicate data streams to those provided by various on-board systems of weapons pod 100. For example, weapons pod 100 could receive location information, such as GPS location data, from onboard GPS receiver 118, from a remote data source on vehicle 150, or both. In addition, information such as target designation, target range, or other information regarding a target may be provided by external as well as internal systems. Since weapons pod 100 may include all the supporting components necessary to operate independently vehicle 150, weapons pod 100 may add offensive weapons capability to nearly any vehicle 150 without any modification to vehicle 150, other than attachment of weapons pod 100. For example, weapons pod 100 may require minimal or zero "A" Kit modification (e.g., to the wiring harness in an aircraft) or mission software modification.

Figure 2:
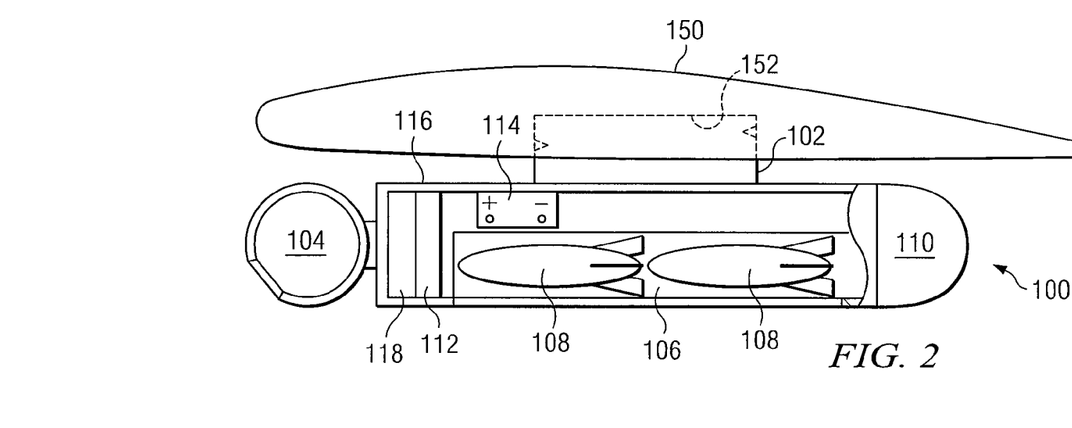
FIG. 2 illustrates a more detailed view of one of the example integrated weapons pods of FIG. 1 with portions removed to expose one or more of the internal components of the integrated weapons pod.

FIG. 2 a more detailed view of weapons pods 100 with portions removed to expose one or more of the internal components of weapons pod 100. In particular embodiments, weapons pod 100 may be coupled to vehicle 150 by a pod interface 102 built into weapons pod 100 that may enable weapons pod 100 to connect to a standardized attachment point 152 built into vehicle 150. Weapons pod 100 may include a targeting system 104, a weapons bay 106 that may contain one or more weapons 108, a data link 110, and a Global Positioning System ("GPS") receiver 118 all of which may be controlled through an on-board Central Processing Unit ("CPU 112") included in weapons pod 100. Weapons pod 100 may further include an external shell 116 that houses these components in a single freestanding unit.

In particular embodiments, weapons pod 100 may be designed to connect to vehicle 150 and interface with one or more of vehicle 150's systems (e.g., a navigation system, a communication system, a vehicle control system) using an attachment point 152 on vehicle 150. While the particular features and capabilities provided by attachment point 152 may vary by design and by vehicle type, a number of attachment point specifications for pods have been formalized and many vehicles may come pre-equipped with a standardized attachment point 152 for weapons pod 100. Because existing attachment point specifications may be expensive and difficult to change and because many vehicles may come pre-equipped with a standardized attachment point that may provide access to a standard set of vehicle systems, weapons pod 100 may be designed according to the capabilities supported by a standardized attachment point 152 for a particular vehicle. Alternatively, or in addition to the vehicle systems made available through attachment point 152, weapons pod 100 may wirelessly interface with one or more systems of vehicle 150 using data link 110. In particular embodiments, weapons pod 100 may be designed to operate within existing Command, Control, Communications, Computers Intelligence ("C4I") infrastructures, including special ops requirements.

Once weapons pod 100 is connected to the attachment point 152, weapons pod 100 and vehicle 150 may interact with one another. As an example and not by way of limitation, the attachment point 152 may be designed to provide power from vehicle 150 to weapons pod 100 using a power connector integrated into attachment point 152. For example, if vehicle 150 is an aircraft, attachment point 152 may provide 28-volt electrical power to weapons pod 100. As an additional example and not by way of limitation, if vehicle 150 is an automobile, attachment point 152 may provide 12-volt electrical power to weapons pod 100. Accordingly, the components of weapons pod 100 may be designed to run on the voltage supplied by vehicle 150 or weapons pod 150 may include a power converter operable to step up or step down the voltage supplied by vehicle 150 to suit the power requirements of the components of weapons pod 100.

In addition to a power connection, attachment point 152 may include a data interface that may enable the computer system of weapons pod 100 (e.g., CPU 112) to control the movement of vehicle 150 or to control various computer systems incorporated into vehicle 150. For example, attachment point 152 may support a standard military pod interface that provides a standardized set of electrical and data connections to vehicle 150. In an example situation, weapons pod 100 may control the movement of vehicle 150 by issuing basic navigation commands (e.g., left/right commands) to an autopilot system of vehicle 150. Depending on the capabilities supported by attachment point 152, the data interface in attachment point 152 may further enable one or more computer systems incorporated in vehicle 150 to control and operate some or all of the components of weapons pod 100.

In addition to serving as the electrical and data interface between weapons pod 100 and vehicle 150, pod interface 102 may also serve the point of physical attachment between vehicle 150 and weapons pod 100. As an example and not by way of limitation, attachment point 152 may include one or more mechanical fastening mechanisms that mechanically attach to pod interface 102. The mechanical fastening mechanisms may be, for example, clamps or clips that enable quick and easy attachment and removal of weapons pod 100 to and from vehicle 150 or bolt holes that enable weapons pod 100 to be bolted to vehicle 150. One of ordinary skill in the art will appreciate that the above-described embodiments of attachment point 152 were presented for the sake of explanatory simplicity and will further appreciate that the present disclosure contemplates including any suitable data interface in the attachment point to enable interaction between any suitable systems and components of weapons pod 100 with any suitable systems and components of vehicle 150. One of ordinary skill in the art will further appreciate that the present disclosure contemplates the use of any suitable attachment mechanism having components distributed in whole or in part on weapons pod 100 and/or vehicle 150 to mechanically attach weapons pod 100 to vehicle 150.

In particular embodiments weapons pod 100 may include a power source 114 that is independent of vehicle 150. As an example and not by way of limitation, power source 114 may be a battery that supplies power to some or all of the components of weapons pod 100. As an additional example and not by way of limitation, power source 114 may be an air turbine or an impeller coupled to a power generation system that generates power whenever there is air flow over weapons pod 100. By including independent power source 114 in weapons pod 100, weapons pod 100 may operate completely independent of vehicle 150 and may need only be physically attached to vehicle 150 for use. In an example embodiment, weapons pod 100 may include welding tabs that enable weapons pod 100 to be welded directly to vehicle 150 rather than using pod interface 102 to attach to vehicle 150. In situations where weapons pod 100 is attached to vehicle 150 without the use of pod interface 102, weapons pod 100 may still have the ability to control vehicle 150 and to be controlled by a remote operator using wireless data link 110. Thus, in particular embodiments, some or all of the data interface features made available through attachment point 152 may also be provided wirelessly through data link 110.

In particular embodiments, weapons pod 100 may control all of the operations and systems of the vehicle 150 at all times, or weapons pod 100 may take control of vehicle 150 only when necessary to achieve a particular purpose of weapons pod 100 (e.g., to acquire accurate target information or to acquire a proper attack vector for firing weapons 108). Accordingly, weapons pod 100 may enable multiple parties (e.g., both human and computer) to potentially control vehicle 150 depending on the situation. For example, if vehicle 150 were an Unmanned Aerial Vehicle (UAV), weapons pod 100 may by controlled by persons local to vehicle 150 (e.g., ground forces located in the striking vicinity of weapons pod 100) and monitored remotely by a pod operator at a remote ground station. Should the pod operator identify a target, the pod operator may remotely take over control of vehicle 150 to investigate the target or to launch a weapon at the target. A target could be for example a structure or particular geographic location. Alternatively, the ground forces local to vehicle 150 may control vehicle 150 to provide aerial weapons support, if needed.

When used on a manned vehicle 150, navigation instructions or piloting instructions could be communicated to the driver of vehicle 150 by weapons pod 100 or, if weapons pod 100 has the capability to directly interface with the navigation system of vehicle 150, weapons pod 100 may take control of vehicle 150 from the driver to achieve a particular purpose. In particular embodiments, weapons pod 100 may be small enough to be relatively portable (e.g., weighing 300 to 400 pounds when unarmed) and may used by special operations forces to retrofit locally available vehicles with weapons capability (e.g., to provide aerial weapons support).

As an example of the operation of weapons pod 100 in a tactical situation, a remote operator in ground forces unit under close range attack may summon vehicle 150 using weapons pod 100 to navigate vehicle 150 to the battle site. After vehicle 150 arrives at the battle site, the remote operator may transmit a suspected target location to weapons pod 100. The pod may direct targeting system 104 toward the target location and may transmit still images or video images of the target to the remote operator using data link 110. The remote operator may then transmit target coordinates to weapons pod 100 which weapons pod 100 may use to designate the target using laser designator 210. After designating the target, weapons pod 100 may initiate a weapons release countdown during which laser spot tracker 208 may confirm that the proper target is designated. Once the countdown expires, weapons pod 100 may launch one or more weapons 108 at the target. In particular embodiments, the remote operator may take over target designation (e.g., from the ground) after weapons 108 have been launched. Once weapons 108 have impacted the target, the remote operator may the use weapons pod 100 for bomb damage assessment of the target.

As mentioned above, each of the components of weapons pod 100 may be housed in an external shell 116 which may provide support and protection for the components of weapons pod 100. External shell 116 may be any rigid fixture or combination of fixtures capable of housing the components weapons pod 100 in a single self-contained unit. As an example and not by way of limitation, external shell 116 may be a shell of rigid material (e.g., metal, Kevlar, carbon fiber, etc.) that encases all of the components of weapons pod 116. As an additional example and not by way of limitation, external shell 116 may only partially encase the components of weapons pod 100, such as for example, if the outer surface of one or more of the components of weapons pod 100 were designed to be part of external shell 116. In particular embodiments, weapons pod 100 may be modular in design having removable components that may readily attached to one another (e.g., snapped together) to form weapons pod 100. Thus, the capabilities of weapons pod 100 could be modified by substituting the components of weapons pod 100 for one another wherein each component may have standard electrical and mechanical interfaces. In such a case, external shell 116 may be formed, in whole or in part, from the external surfaces of each of the constituent components of weapons pod 100.

In particular embodiments external shell 116 may be made from multiple materials. As an example and not by way of limitation, a rear portion of external shell 116 may include a radome (e.g., comprised of a material that is permeable by electromagnetic radiation) which houses data link 110 or other wireless or radar components of weapons pod 100 coupled to a front metal portion of external shell 116 which houses targeting system 104, weapons bay 106, and CPU 112. In particular embodiments, external shell 116 may be completely made of metal (e.g., fully armored) and may include a patch antenna disposed on the outside of external shell 116 to enable wireless communication. Depending upon the design of weapons pod 100, weapons pod 100 may include a phased array patch antenna attached to the outer surface of weapons pod 100 operating as a form of radar. In particular embodiments, external shell 110 may be designed for stealth. One of ordinary skill in the art will appreciate that the above-described embodiments of external shell 116 were presented for the sake of explanatory simplicity and will further appreciate that the present disclosure contemplates using any suitable components or materials in any suitable design of external shell 116.

Figure 3:
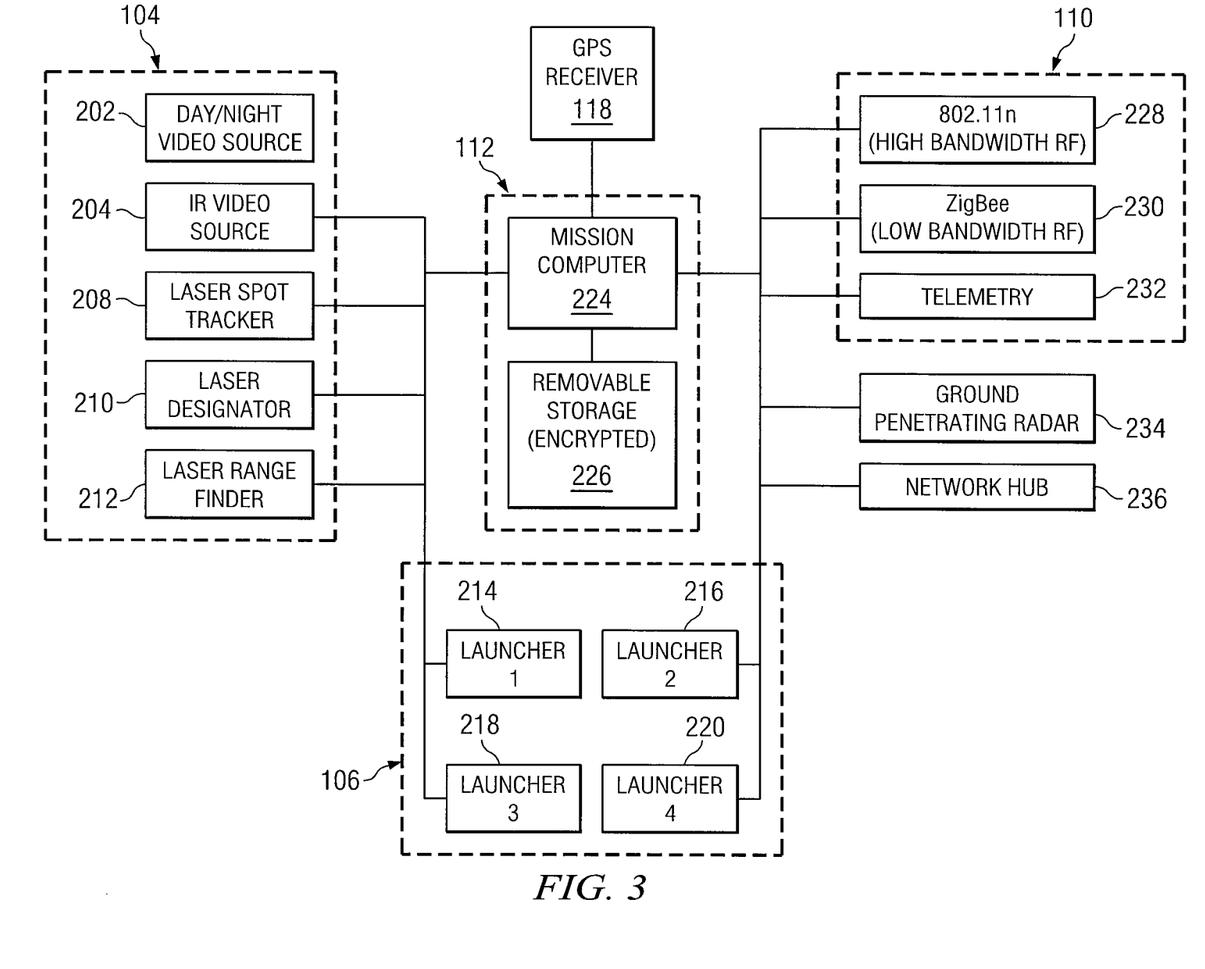
FIG. 3 illustrates a component-level diagram of various example components that may be included in the weapons pod of FIG. 2 in accordance with a particular embodiment of the present disclosure.

FIG. 3 illustrates a component-level diagram of various example components of weapons pod 100 including targeting system 104, CPU 112, weapons bay 106, data link 110, GPS receiver 118, and a ground penetrating radar system 234. While the components of FIG. 3 are logically grouped and compartmentalized for explanatory purposes, one of ordinary skill in the art will appreciate that certain functionality, while described with respect to a single component of weapons pod 100 may be performed in a distributed fashion among multiple components of weapons pod 100, by another component of weapons pod 100, or even by a component of vehicle 150 linked to weapons pod 100 and suitable for performing the described functionality without departing from the scope of the present disclosure.

In particular embodiments, weapons pod 100 may acquire a target using targeting system 104. Targeting system 104 may include any component of hardware or software or combination of two or more such components capable of acquiring location information for a target. As an example and not by way of limitation, targeting system may be a combination of electrooptic and infrared sensors included in a Forward Looking InfraRed ("FLIR") ball mounted on a Gimbaled sensor platform that provides target location information to weapons 108. Targeting system 104 may include, for example, a video source 202 (e.g., a television camera) for providing video images, a thermal imager 204 (e.g., a cooled or uncooled infrared sensor) for providing thermal images, a laser spot tracker 208 for tracking and confirming the location of a target, a laser designator 210 for designating a target, and a laser range finder 212 for acquiring the range to a target. In particular embodiments, information gathered by targeting system 104 may be used, for example, to guide weapons 108 to a target or to enable a remote operator to survey a target, to guide vehicle 150 to a target, or to perform bomb damage assessment ("BDA") of a target. Depending upon the design of weapons pod 100, one or more of the components of targeting system 104 may be steerable, enabling weapons pod 100 to direct targeting system 104 towards a target as vehicle 150 travels along a path.

For example, targeting system 104 may include a Risley prism beam steering system (e.g., a two axis or three axis Risley Beam Director) to direct optical beams toward a target. Any alignment errors may be offset using optical calibration provided by the beam director. An example of a three axis Risley beam director suitable for use in weapons pod 100 may have an approximate slew rate of greater than 30 degrees per second, a mass of approximately 35 lbs. (as opposed to approximately 20 lbs. for a two axis beam director), an approximate power consumption of less than 220 milliwatts (mW) per stator, an absolute pointing accuracy of less than 100 microrad (e.g., after calibration), a resolution of less than 10 microrad, a control bandwidth of greater than 10 hertz, and a jitter of less than 20 microrad. Aside from optical beam steering, targeting system may include a mechanically moveable platform (e.g., a Gimbaled platform) that may aim targeting system 104 at a target by physically turning the targeting system 104 toward a target. One of ordinary skill in the art will appreciate that the above-described systems for directing targeting system 104 at a target were presented for the sake of explanatory simplicity and will further appreciate that the present disclosure contemplates using any suitable electrical or mechanical mechanism, either passive or active, or combination of two or more such mechanisms capable of directing targeting system 104 at a target.

Weapons pod 100 may gather video images of a target using video source 202. Such images may be used, for example, for target acquisition, vehicle guidance, or bomb damage assessment ("BDA"). For instance, after a target has been hit by a weapon 108, video source 202 may collect video footage of the target to confirm that the target has been destroyed. Thus, weapons pod my be used to add not only weapons capability to vehicle 150, but reconnaissance and BDA capability as well. Video source 202 may be any component of hardware or software or combination of two or more such components capable of acquiring video or pictorial images of a target. Video sources are well known to those of ordinary skill in the art and the present disclosure contemplates the use of any suitable video source 204 in weapons pod 100. In particular embodiments, video source 202 may be a video camera having daytime and nighttime filming capability. As an example and not by way of limitation, video source 202 may be a digital video camera (e.g., an on-chip camera) having a high resolution zoom lens with an image stabilization package.

As an alternative or in addition to the video images gathered by video source 202, weapons pod 100 may collect thermal images of a target using thermal imager 204. Thermal imaging capability may enable weapons pod 100, for example, to detect targets that may be camouflaged from video source 202 by detecting heat signatures. Thermal imager 204 may be any component of hardware or software or combination of two or more such components capable of acquiring thermal images of a target. Thermal imagers are well known to those of ordinary skill in the art and the present disclosure contemplates the use of any suitable thermal imager 204 in weapons pod 100. As an additional example and not by way of limitation, thermal imager 204 may be an APACHE Thermal Imager manufactured by Indigo Systems, Inc. operating on a three to five micron wavelength. Such a thermal imager may have a resolution of 640 by 512 pixels, a pitch of 20 microns, a cool down time of less than 7 minutes, a ⅓ Watt liner cryocooler, an NUC time of less than 20 seconds for 2-point, a frame rate of 30 full frame, a 2× digital zoom, a power consumption of 14 watts steady state, and a weight of 1.95 pounds.

Laser designator 210 may be any component of hardware or software or combination of two or more such components capable of designating a target with a laser beam. Laser designators are well known to those of ordinary skill in the art and the present disclosure contemplates the use of any suitable laser designator 210 in weapons pod 100. In example operation, laser designator may be a laser emitter that emits a coded laser signal at a target. This code can be described as unique series of laser pulses emitted by laser designator 210. The coded laser signal of laser designator 210 may enable other components of weapons pod 100 (e.g., laser spot tracker 208 or laser guided weapons 108) to "lock on" to the specific laser signal emitted by laser designator 210 using the code. As used in conjunction with weapons 108, laser designator 210 may shine a laser beam on a target to designate the target. When laser guided weapon 108 is deployed, laser-guided weapon 108 may use the laser signal reflected off the target to guide itself to the target.

As an example and not by way of limitation, laser designator 210 may be a standard laser designator manufactured by Fibertek, Inc. Such a laser designator may have a wavelength of approximately 1.06 microns, a pulse width of approximately 10 nanoseconds at approximately 30 millijoules, a beam divergence of approximately 300 microrads, a beam wander of less than or equal to 30 microrads, a pulse repetition rate of approximately 10 to 20 hertz, an input power of approximately 30 watts and a weight of less than three pounds. Depending upon the design of laser designator 210, laser designator 210 may further include the capabilities of laser range finder 212 discussed below.

In particular embodiments, laser designator 210 may operate in conjunction with laser spot tracker 208 to confirm that a target designated by laser designator 210 is indeed the intended target of weapons pod 100. As an example and not by way of limitation, information from laser spot tracker 208 and laser designator 210 may be overlaid onto images provided by video source 202 and thermal imager 204 to enable a remote operator of weapons pod 100 to visually confirm that the proper target is being designated.

Laser spot trackers are well known to those of ordinary skill in the art and the present disclosure contemplates the use of any suitable laser spot tracker 212 in weapons pod 100. In example operation, laser spot tracker 208 may be a sensor in targeting system 104 that picks up a coded laser signal reflected off of a target that is being designated by laser designator 210. After receiving the reflected laser signal off of the designated target, laser spot tracker 208 may output a signal to CPU 112 that identifies the location of the target being designated by laser designator 210. CPU 112 may then graphically overlay this signal onto a video image of the target to graphically indicate the designated target on the display, for example, by circling the designated target on the display. By graphically indicating the designated target on the display, laser spot tracker 208 may enable an operator to visually confirm that laser designator 210 is designating the proper target. As an example and not by way of limitation, laser designator may be a LONESTAR laser seeker produced by EFW, Inc., the assignee of the present application.

Laser range finder 212 may be any component of hardware or software or combination of two or more such components capable of acquiring the distance to a target using a laser. In particular embodiments laser range finder 212 may comprise two basic components a laser and a co-located laser range finding ("LRF") receiver. In example operation, to calculate the distance to a target, targeting system 104 may fire a laser at the target, for example, using laser designator 210 or other suitable laser source, and may collect the reflected signal using a co-located LRF receiver. Based on the travel time of the laser, the LRF receiver may calculate the distance to the target which may then be used, for example, to guide weapons 108 to the target. To avoid false readings, the LRF receiver may be tuned to pick up only the frequency of light emitted by the laser, or the laser signal may be coded to enable the LRF receiver to distinguish the laser signal from other laser signals. Laser range finders are well known to those of ordinary skill in the art and the present disclosure contemplates the use of any suitable laser range finder 212 in weapons pod 100.

As an example and not by way of limitation, laser range finder 212 may include a MK-88 Diode Pumped laser manufactured by KIGRE, Inc. Such a laser may have a wave length of approximately 1.5359 microns, an output energy of less than 7 millijoules, a pulse width of approximately 6 nanoseconds, a repetition rate of approximately 1 hertz in continuous operation, a beam divergence of approximately 4.8 millirad, a beam wander of less than 0.5 millirad a range of approximately 20 kilometers, and a weight of approximately 1.5 pounds.

Laser range finder 212 may further include an LRF receiver. An example LRF receiver suitable for use in weapons pod 100 may include a Indium Gallium Arsenide ("InGaAs") detector having a detector sensitivity of approximately 15 nanowatts, a pulse width of approximately 7 nanoseconds, a range resolution of approximately 1 meter, a multiple target resolution of approximately 5 meters, a clear aperture of approximately 6 millimeters, and a weight of less than 0.2 pounds.

One of ordinary skill in the art will appreciate that the above-described components of targeting system 104, and the example embodiments presented thereof, were presented for the sake of explanatory simplicity and will further appreciate that the present disclosure contemplates the use of any suitable component(s) capable of performing the functionality described herein with respect to targeting system 104 without departing from the scope of the present disclosure.

As mentioned above, targeting system 104 may provide targeting information for one or more weapons 108 housed in weapons bay 106. Weapons bay 106 may be an internal chamber in weapons pod 100 having an opening through which weapons 108 may be deployed. Depending upon the design of weapons bay 106, the opening may include a retractable or detachable door that may be opened to deploy weapons 108. While in the pictured embodiment, weapons bay 106 includes a first launcher 214, a second launcher 216, a third launcher 218, and a fourth launcher 220, each capable of independently launching a weapon 108, the present disclosure contemplates any suitable number and type of weapons 108 being included in weapons bay 106. Weapons bay 106 may further include any suitable storage and/or deployment mechanisms known to one of ordinary skill in the art (e.g., quick release clamps, mountings, etc.) to be needed to stow weapons 108 in weapons bay 106.

In particular embodiments, weapons bay 106 may be a modular component of weapons pod 100 that may be interchanged depending upon the particular type of weapons 108 included in weapons pod 100. As an example and not by way of limitation, weapons bay 106 could be tailored to fit two laser guided Archer Real-Time Attack System ("ARCHER") missiles produced by Raytheon Company. As an additional example and not by way of limitation, weapons bay 106 could be tailored to fit four laser guided GBU-44/B "VIPER STRIKE" guided munitions produced by Northrop Grumman Corporation. As yet another example and not by way of limitation, weapons bay 106 could be tailored to fit a single small diameter bomb ("SDB"). In another example embodiment, the size of weapons bay 106 may be adjustable (e.g., extendable) to fit different weapons 108 or weapons bay 106 may be designed to have a universal size that fits a number of different types of weapons 108.

Weapons 108 may be, for example, one or more laser-guided, GPS-guided, or other form of smart bomb, smart missile, or other smart munitions. Each of weapons 108 may or may not use all of the targeting capabilities of targeting system 104. For example, some weapons 108 may use GPS guidance, some weapons 108 may use laser guidance and some weapons 108 may use both GPS guidance and laser guidance. One of ordinary skill in the art will appreciate that the above-described weapons 108 were presented for the sake of explanatory clarification and will further appreciate that the present disclosure contemplates any suitable weapons 108 or combination of different types of weapons 108 being used in weapons pod 100.

In particular embodiments, CPU 112 may control each of the systems and components included in weapons pod 100 and may, depending upon the capabilities of vehicle 150, control some or all of the system of vehicle 150. Depending upon the design of CPU 112, CPU 112 may include a mission computer 224 and an encrypted removable storage device 226.

Mission computer 224 may be responsible for implementing all mission control activities necessary to run weapons pod 100. For example, mission computer 224 may be responsible for video switching between the various sensors in targeting system 104 (e.g., video source 202 and thermal imager 204), controlling of the various systems of weapons pod 100 (e.g., launching weapons 108), recording images (e.g., video and photographic), overlaying video images, targeting, and combining of sensory input from each of the components in targeting system 104 to create a comprehensive set of integrated sensor data (e.g., performing sensor fusion). Mission computer 224 may further be responsible for processing navigation data from GPS receiver 118 to navigate vehicle 150 to a target or to guide weapons 108 to a target. Generally, mission computer 224 may be implemented to perform any suitable mission control function. One of ordinary skill in the art will appreciate that the above-described functions of mission computer 224 were presented for the sake of explanatory simplicity and will further appreciate that the present disclosure contemplates mission computer 224 performing any suitable computer-based processes either autonomously or under the direct control of a human operator to run weapons pod 100.

Mission computer 224 may include a microprocessor and any other suitable computing device, resource, or combination of hardware, software and/or encoded logic operable, either alone or in conjunction with other components of weapons pod 100 (e.g., removable storage device 226), to provide computer-based mission control functionality of weapons pod 100. As an example and not by way of limitation, for video processing, mission computer 224 may include a ("DA VINCI") TMS320DM6467 DSP-based system-on-chip ("SoC") produced by Texas Instruments, Inc. As an additional example and not by way of limitation, mission computer 224 may include a general purpose Single Board Computer such as for example the JREXPLUS-LX produced by Kontron AG. While CPU is illustrated as being an independent component of weapons pod 100, some or all of the functionality and features herein may reside and be performed in a distributed fashion amongst multiple components of weapons pod 100. For example, laser spot tracker 208 may include a field-programmable gate array ("FPGA") operable to perform laser spot tracker conformation processing or electrooptic processing. Such an FPGA may be a STRATIX III FPGA device produced by Altera Corporation. One of ordinary skill in the art will appreciate that the above-described embodiments of mission computer 224 were presented for the sake of explanatory simplicity and will further appreciate that the present disclosure contemplates the use of any suitable computing system or combination of computing systems operable to provide computer-based mission control functionality of weapons pod 100.

Removable storage device 226 may be any form of volatile or non-volatile memory including, without limitation, magnetic media, optical media, random access memory (RAM), read-only memory (ROM), removable media, or any other suitable memory component known to those of ordinary skill in the art. In particular embodiments, removable storage device 226 may store information gathered by weapons pod 100. For example, as weapons pod 100 surveys a target, video footage gathered by video source 202, thermal images gathered from thermal imager 204, target distances gathered by laser range finder 212, and any other suitable sensor information may be stored in removable storage device 226. Removable storage device 226 may also store any programs needed to operate the components of weapons pod 100 as well as any information needed to carry our a particular mission (e.g., maps). During the operation of vehicle 150, storage device 226 may further serve as a counterpart to a flight data recorder that may record various activities that take place at vehicle 150. Depending upon the design of weapons pod 100, removable storage device 226 may serve as the primary means of data storage for weapons pod 100; however, in particular embodiments, weapons pod 100 may transmit some or all of the information recorded in removable storage device 226 to a remote location for back up purposes.

In particular embodiments, the contents of removable storage device 226 may be encrypted to prevent unauthorized personnel from accessing information stored therein. For example, if weapons pod 100 fell into enemy hands, the encryption of removable storage device 226 may prevent an enemy from using weapons pod 100 or from retrieving any information stored on removable storage device 226. One of ordinary skill in the art will appreciate that the above-described embodiments of removable storage device 226 were presented for the sake of explanatory simplicity and will further appreciate that the present disclosure contemplates including any suitable memory component in removable storage device 226 capable of storing any suitable information for weapons pod 100.

In particular embodiments, location information regarding weapons pod 100 may be provided to CPU 112 by an on-board GPS receiver 118 which weapons pod 100 may use, for example, to navigate vehicle 150 or a weapon 108 to a target. Depending upon the design of GPS receiver 118, a navigation and location processing system may be included in GPS receiver 118 or coupled to GPS receiver 118 to enable GPS receiver 118 to serve as a fully functional navigation and location processing unit. For example, if weapons pod 100 is able to control the movement of vehicle 150, GPS receiver 118 may enable weapons pod 100 to automatically navigate vehicle 150 to a target after receiving the coordinates of the target. As another example, if weapons pod 100 is able to interface with a video display in vehicle 150, weapons pod 100 may display information from GPS receiver 118 to a driver of vehicle 150 to enable the driver to navigate vehicle 150 to a target. As an alternative to on-board GPS receiver 118, CPU 112 may interface with a GPS receiver integrated in vehicle 150 to provide similar or identical functionality as would be available using on-board GPS receiver 118.

GPS receiver 118 may be any component of hardware or software or combination of two or more such components capable of acquiring approximately real-time location information regarding weapons pod 100 from a global positioning network or other network capable of providing such location information. GPS receivers are well known to those of ordinary skill in the art and the present disclosure contemplates the use of any suitable GPS receiver 118 in weapons pod 100. As an example and not by way of limitation, GPS receiver 118 may be a TRUTRACK Locator produced by L-3 Communications Holdings, Inc. One of ordinary skill in the art will appreciate that the above-described embodiments and uses for GPS receiver 118 were presented for the sake of explanatory simplicity and will further appreciate that the present disclosure contemplates using any suitable GPS system to acquire location information for weapons pod 100, include an external GPS system located on vehicle 150 and capable of exchanging data with weapons pod 100, for example, using data link 110.

In particular embodiments, information may be transmitted to and from weapons pod 100 using data link 110. Data link 110 may be any component of hardware or software or combination of two or more such components capable of enabling weapons pod 100 to wirelessly exchange data with an external computer system over a secure data link. Data links are well known to those of ordinary skill in the art and the present disclosure contemplates the use of any suitable data link 110 in weapons pod 100. As an example and not by way of limitation data link 110 may be a Link 16 compatible data link system such as the T-Series Model U Airborne Data Link produced by L-3 Communications holdings, Inc. The Model-U Airborne Data Link is a small, lightweight, programmable networked capable data link featuring exportable Commercial-Off-The-Shelf (COTS) technology. The Model-U is a U.S. Common Data Link (CDL) and NATO STANAG 7085-compliant system supporting data rates to 45 Mbps. Link 16 is a TDMA-based secure, jam-resistant high-speed digital data link which may operate over-the-air in the L band portion (969-1206 MHz) of the UHF spectrum.

In particular embodiments, data link 110 may include a Wi-Fi component 228 operating based on the IEEE 802.11n protocol for High Bandwidth Radio Frequency ("RF") communications and a ZigBee component 230 operating based on the IEEE 802.15.4 protocol for low bandwidth RF communications. ZigBee may be beneficial for low bandwidth RF as a low-power, wireless mesh networking standard. The low power-usage may provide longer life with smaller batteries, and the mesh networking may provide high reliability. Data link 110 may further include a telemetry component 232 operable to transmit data regarding of various on-board systems of weapons pod 100 and vehicle 150 to a remote operator.

As mentioned above, in particular embodiments data link 110 may enable a remote operator to control weapons pod 100, or more specifically, one or more components of weapons pod 100, by wirelessly transmitting commands or other information to weapons pod 100 using data link 110. For example, if vehicle 150 was an aircraft, the remote operator could be an engineer located at a ground station, a pilot located on a neighboring aircraft, a member of a ground forces unit located in the field of battle, or even the pilot of vehicle 150. In any case, data link 110 may enable each of these parties to communicate with and control weapons pod 100 using any suitable computing device (e.g., a desktop computer, a laptop, a web accessible server, or a personal digital assistant ("PDA")) operable to wirelessly transmit commands or other control information (e.g., target coordinates which may be automatically processed into navigation commands by CPU 112) to data link 110 either directly or indirectly through one or more intervening communication networks or systems.

In particular embodiments, weapons pod 100 may further transmit approximately real-time information (e.g., video information from video source 202, system status information from CPU 112, etc.) back to the remote operator using data link 110, for example, to enable the remote operator to understand the present environment and condition of weapons pod 110 or a target. Depending upon the design of weapons 108, data link 110 may further enable weapons pod 100 to exchange information (e.g., GPS data, navigation commands, video information, etc.) with one or more of weapons 108.

For example, weapon 108 may include a on-board video source which may feed in-flight video data or distance data back to data link 110 as weapon 108 proceeds towards a target. As another example, data link 110 may enable weapons pod 100 to issue navigation commands to weapon 108 during flight. In particular embodiments, data link 110 may further enable weapons pod 100 to communicate with and control one or more systems on vehicle 150. One of ordinary skill in the art will appreciate that the above-described embodiments of data link 110 were presented for the sake of explanatory simplicity and will further appreciate that the present disclosure contemplates the use of any suitable wireless data link based on any suitable wireless protocol(s) in data link 110.

In particular embodiments, weapons pod 100 may be equipped with a ground penetrating radar system 234, for example, to enable weapons pod 100 to search for land mines. Once radar system 234 is incorporated into weapons pod 100, radar system 234 may enable weapons pod to identify objects located beneath the ground. As an example and not by way of limitation, radar system 234 may be a modular component of weapons pod 100 that may substituted in place of weapons bay 106. If vehicle 150 is an aircraft, vehicle 150 may detect landmines by flying over a field or other terrain while scanning with radar system 234. An example ground penetrating radar system suitable for using in weapons pod 100 is produced by Global Technical Solutions ("GTS").

In particular embodiments, weapons pod 100 may be equipped with a networking hub 236, for example, to enable weapons pod 100 to expand the communications capability available to ground forces beyond line of sight communication capabilities. Once networking hub 236 is incorporated into weapons pod 100, weapons pod may provide extended communications coverage using networking hub 236 by acting as an intermediate transmission point between two communicating parties. As an example and not by way of limitation, networking hub 236 may be a modular component of weapons pod 100 that may substituted in place of weapons bay 106.

In particular embodiments, weapons pod 100 may be equipped with a synthetic aperture radar (SAR), for example, to enable weapons pod 100 to expand the reconnaissance capabilities of weapons pod 100. Once the SAR is incorporated into weapons pod 100, the SAR may work in conjunction with thermal imager 204 to provide reconnaissance images of a target. As an example and not by way of limitation, networking hub 236 may be a modular component of weapons pod 100 that may substituted in place of weapons bay 106.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed is:

1. An integrated weapons pod capable of adding self-contained offensive weapons capability to a vehicle, comprising a plurality of pod components including a targeting system, a weapons bay, a central processing unit ("CPU"), a wireless data link, and an external shell, wherein:
   the external shell houses the targeting system, the weapons bay, the CPU, and the wireless data link in a single freestanding unit;
   the weapons bay is configured to house one or more weapons and deploy the one or more weapons at a target;

the CPU is operable to autonomously control operation of the targeting system, the weapons bay, the wireless data link, and the vehicle;

the targeting system is operable to provide to the one or more weapons location information identifying a location of the target;

the wireless data link is operable to exchange data with a remote operator, and wherein the external shell houses the targeting system, the weapons bay, the CPU, and the wireless data link in the single freestanding unit such that the external shell houses systems for autonomously deploying a weapon of the weapons bay at a target without reliance on the vehicle, and wherein the CPU housed in the external shell is operable to transmit one or more navigation commands to an autopilot system such that the CPU of the integrated weapons pod automatically controls the movement of the vehicle.

2. The integrated weapons pod of claim 1, wherein:

the external shell further comprises a pod interface configured to attach to a preconfigured attachment point on the vehicle; and the pod interface comprises a power input operable to transmit electrical power from the vehicle to one or more of the plurality of pod components.

3. The integrated weapons pod of claim 1, wherein the data comprises component control information; and the wireless data link enables the remote operator to control one or more of the plurality of pod components by transmitting the component control information from the remote operator to the CPU.

4. The integrated weapons pod of claim 2, wherein the pod interface further comprises a vehicle control interface operable to transmit vehicle control information from the CPU to the vehicle.

5. The integrated weapons pod of claim 1, wherein:

the targeting system comprises a laser designator, a laser spot tracker, a thermal imager, and a video camera;

the data comprises viewing information from the targeting system; and the wireless data link enables the remote operator to view the target by transmitting the viewing information from the targeting system to the remote operator.

6. The integrated weapons pod of claim 5, wherein:

the laser designator is operable to designate the target with a laser beam;

the laser spot tracker is operable to receive a portion of the laser beam reflected off the target and generate an indication that enables the remote operator to visually confirm that the laser designator is designating the target; and the viewing information comprises the indication from the laser spot tracker.

7. The integrated weapons pod of claim 6, wherein the viewing information comprises the portion of the laser beam reflected off the target.

8. The integrated weapons pod of claim 1, further comprising a Global Positioning System ("GPS") receiver operable to provide the CPU with an approximately real-time location of itself.

9. The integrated weapons pod of claim 1, further comprising a vehicle-independent power source which powers one or more of the plurality of pod components.

10. The integrated weapons pod of claim 1, wherein the CPU further comprises a removable storage device operable to store data from CPU.

11. The integrated weapons pod of claim 1, wherein the CPU housed in the external shell is operable to transmit one or more commands to control all operations of the vehicle such that the CPU automatically controls all operations of the vehicle.

12. The integrated weapons pod of claim 2, wherein the pod interface is configured to receive electrical power from the vehicle through the preconfigured attachment point.

13. A method of adding self-contained offensive weapons capability to a vehicle using an integrated weapons pod comprising a plurality of pod components including a targeting system, a weapons bay, a central processing unit ("CPU"), a wireless data link, and an external shell, comprising the steps of:

using the external shell to house the targeting system, the weapons bay, the CPU, and the wireless data link in a single freestanding unit;

configuring the weapons bay to house one or more weapons and deploy the one or more weapons at a target;

using the CPU to autonomously control operation of the targeting system, the weapons bay, the wireless data link, and the vehicle;

once the one or more weapons are deployed, using the targeting system to provide to the one or more weapons location information identifying a location of the target; and exchanging data with a remote operator using the wireless data link;

transmitting one or more navigation commands to an autopilot system of the vehicle such that the CPU of the integrated weapons pod automatically controls the movement of the vehicle, and wherein the external shell houses the targeting system, the weapons bay, the CPU, and the wireless data link in the single freestanding unit such that the external shell houses systems for autonomously deploying a weapon of the weapons bay at a target without reliance on the vehicle.

14. The method of claim 13, wherein:

the external shell further comprises a pod interface configured to attach to a preconfigured attachment point on the vehicle; and using a power input included in the pod interface to transmit electrical power from the vehicle to one or more of the plurality of the pod components.

15. The method of claim 13, wherein the data comprises component control information and further comprising enabling the remote operator to control one or more of the plurality of pod components by transmitting the component control information from the remote operator to the CPU using the wireless data link.

16. The method of claim 14, wherein the data comprises vehicle control information and further comprising:

using a vehicle control interface included in the pod interface to transmit the vehicle control information from the CPU to the vehicle.

17. The method of claim 13, wherein:

the data comprises viewing information from the targeting system;

the targeting system comprises a laser designator, a laser spot tracker, a thermal imager, and a video camera; and further comprising:

enabling the remote operator to view the target by transmitting the viewing information from the targeting system to the remote operator using the wireless data link.

18. The method of claim 17, further comprising:
using the laser designator to designate the target with a laser beam;
using the laser spot tracker to receive a portion of the laser beam reflected off the target and generate an indication that enables the remote operator to visually confirm that the laser designator is designating the target wherein the viewing information comprises the indication from the laser spot tracker.

19. The method of claim 18, wherein the viewing information comprises the portion of the laser beam reflected off the target.

20. The method of claim 13, further comprising using a Global Positioning System ("GPS") receiver included in the weapons pod to provide the CPU with an approximately real-time location of the weapons pod.

21. The method of claim 13, further comprising powering one or more of the plurality of pod components using a vehicle independent power source included in the weapons pod.

22. The method of claim 13, further comprising transmitting one or more commands from the CPU housed in the external shell to the vehicle such that the CPU automatically controls all operations of the vehicle.

23. The method of claim 14, wherein the pod interface is configured to receive electrical power from the vehicle through the preconfigured attachment point.

* * * * *